United States Patent
Massoney

[11] 3,865,006
[45] Feb. 11, 1975

[54] PUSH TYPE THREADED FASTENER AND METHOD OF USING SAME

[75] Inventor: Dwight F. Massoney, Rockford, Ill.

[73] Assignee: Textron Inc., Rockford, Ill.

[22] Filed: Feb. 14, 1973

[21] Appl. No.: 332,280

[52] U.S. Cl. .................................... 85/44, 85/46
[51] Int. Cl. ........................................ F16b 25/00
[58] Field of Search ................. 85/46, 44; 151/22

[56] References Cited
UNITED STATES PATENTS

| 289,333 | 11/1883 | Bray | 85/44 |
| 408,751 | 8/1889 | Rose | 85/44 |
| 2,005,672 | 6/1935 | Chaffee | 85/44 |
| 3,633,455 | 1/1972 | Larson | 85/46 |

Primary Examiner—Edward C. Allen
Attorney, Agent, or Firm—Olson, Trexler, Wolters, Bushnell & Fosse, Ltd.

[57] ABSTRACT

The embodiment of the invention disclosed herein is directed to a push type fastener and method of using the same in the securing of a workpiece to a member formed of pliable plastic having substantial amounts of resiliency. The fastener has a head portion which can receive a driving tool for pushing the fastener into the pliable plastic material until the head portion of the fastener abuts the surrounding wall of the workpiece. A threaded shank has a leading guide portion including substantially circular, reduced diameter threads formed therealong and a trailing portion including substantially non-circular, multi-lobular enlarged diameter threads which extend from the leading guide portion to the head portion. The threads have a front flank sloping toward the leading end of the shank at an angle to allow the pliable, resilient material to slide easily over the threads while the fastener is being inserted. The rear flank of the threads are disposed at a more abrupt angle to resist pull out. During seating of the fastener, which by pushing or driving the fastener into the plastic material without turning said fastener, the non-circular thread form on the trailing portion will form the recess wall to a corresponding slope, i.e. non-circular. Accordingly, upon rotation of the fastener a quarter turn after seating, two results are obtained; first the lobes on the fastener will be firmly engaged in the relatively flat portions of the aperture wall to provide a locking action, and secondly, the fastener will seat more firmly.

2 Claims, 8 Drawing Figures

PATENTED FEB 1 1 1975　　3,865,006

PUSH TYPE THREADED FASTENER AND METHOD OF USING SAME

BACKGROUND OF THE INVENTION

This invention is directed generally to fasteners, and more particularly to threaded fasteners which are driven axially into pliable material and thereafter locked in place by a slight rotation movement.

Heretofore, the use of threaded fasteners having different slopes at the front and rear flanks of the threads have been used to join wood members together quickly and efficiently. For example, such threaded fasteners have been provided with a sharp cutting tip to be hammered or driven into the wood and then turned a number of revolutions to effect the necessary tightening action. This type of fastener is merely placed over the general area to which it is to be inserted and then hammered or otherwise driven through the wood fibers.

When joining plastic components together it is generally accomplished by threading into a preformed hole formed in the plastic material so that the threads of the fastener can cold work the plastic material to form its own thread. There are many well known types of self-tapping fasteners which perform this general function. However, when utilizing fasteners which are to be driven into plastic material the fasteners tend to become misaligned and are difficult to position in registry with the hole or opening thus requiring substantial amounts of time by the personnel doing the work.

SUMMARY OF THE INVENTION

Accordingly, it is an object of this invention to provide a new and improved push type fastener which can be quickly and easily inserted into openings formed in pliable plastic material.

Another object of this invention is to provide a push type fastener which has alignment means formed at the leading end of the threaded shaft to assist in initial insertion into the opening receiving the fastener.

Still another object of this invention is to provide a new and improved push type fastener which, when driven home, can be locked in place by rotating the fastener less than one full revolution.

Briefly, the push type fastener of this invention is most advantageously utilized in connecting components to material formed of pliable, resilient material having openings or holes formed therein to receive the threaded shank of the fastener. The fastener is driven into place, urging the head thereof firmly against the material around the opening receiving the same, and then the fastener is rotated, for example one-sixth revolution, to effect a plowing action of multi-lobed threads through the pliable material.

In the preferred embodiment the fastener has a threaded shank having a leading guide portion including substantially circular, reduced diameter threads formed therealong, and a trailing portion including substantially non-circular, multi-lobular enlarged diameter threads which extend from the leading guide portion to the head portion. In the area of at least the non-circular threads the front flank of the threads has a slope in the order of about 40° to 60° so that inserting the fastener through the pliable plastic causes the plastic to flow about the threaded shank of the fastener. Once the fastener is driven home the pliable plastic material will cold flow into the space between the threads. The locking action of the threads is enhanced by providing a rear flank slope or angle in the order of about 0° to 10°, thus forming a relatively sharp rearward edge on the threads. After the fastener is inserted axially it is rotated about one-sixth revolution, this being the case where tri-roundular threads are used, to cause the thread lobes to plow into the pliable plastic material. This plowing action substantially fills the grooves between the threads and locks the fastener, and the associated components together.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
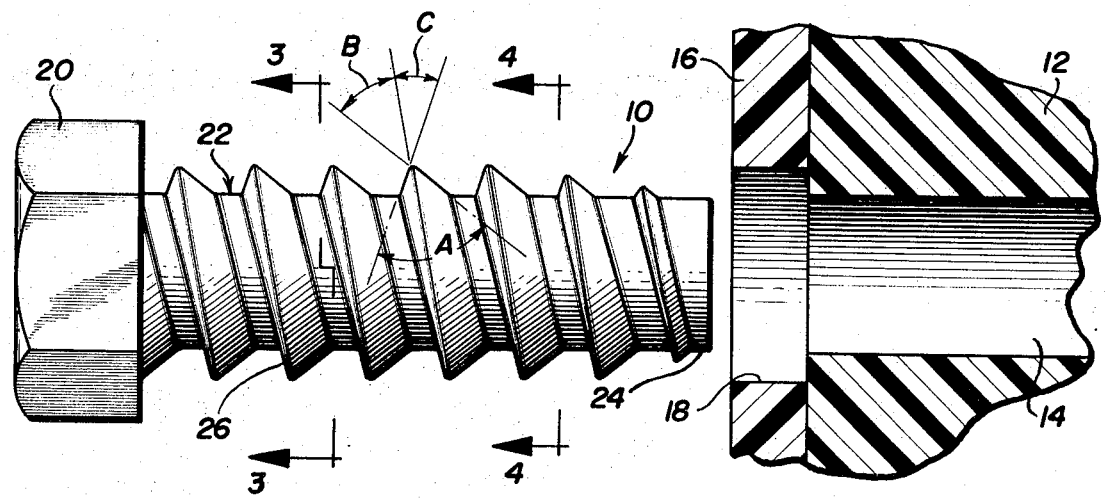
FIG. 1 is an enlarged exploded view showing the fastener of this invention in position to be inserted into an opening formed in pliable plastic material.

Referring now to FIG. 1 a push type threaded fastener is shown, constructed in accordance with the principles of this invention and designated generally by reference numeral 10. The push type threaded fastener 10 is designed for insertion into a body of pliable plastic material 12 having an opening 14 formed therein. In general use a member 16 may be positioned over the body and may include an aperture 18 in registry with the opening 14. To secure the member 16 to the body 12 the fastener 10 is inserted in a manner to be described.

The fastener 10 includes a head portion 20 which may have any one of a plurality of conventional configurations so as to receive a tool which may be used to drive the fastener in and rotate it through a fractional part of a revolution to lock the fastener in position. Extending from the head 20 is a threaded shank 22 which has a leading, guide portion 24 formed at the end thereof and a trailing, locking portion 26 formed between the guide portion 24 and the head 20. The overall extent of the locking portion 26 can vary depending on the use of the fastener.

Figure 2:
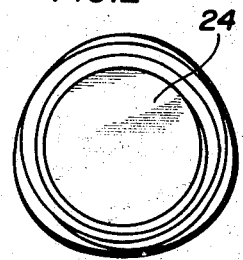
FIG. 2 is an end view of the fitted shank of the fastener of FIG. 1.
Figure 3:
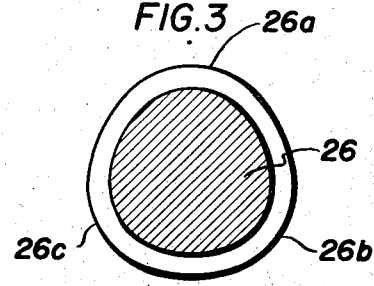
FIG. 3 is a sectional view taken along line 3—3 of FIG. 1.
Figure 4:
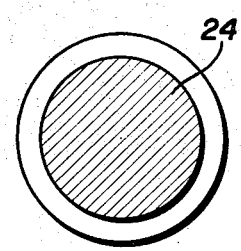
FIG. 4 is a sectional view taken along line 4—4 of FIG. 1.

FIG. 2 is an end view of the fastener of FIG. 1 and shows the leading guide portion 24 extending to the very end of the fastener. The sectional view shown in FIG. 4 shows the guide portion 24 as extending some distance back from the end where it still has the same general circular configuration. FIG. 3 illustrates the locking portion 26 and shows a triroundular configuration of the threads which includes lobe portions 26a, 26b, and 26c. The lobe portions 26a, 26b, and 26c will dig into and plow through the pliable plastic material when the fastener is rotated so that locking action takes place.

Figure 5:
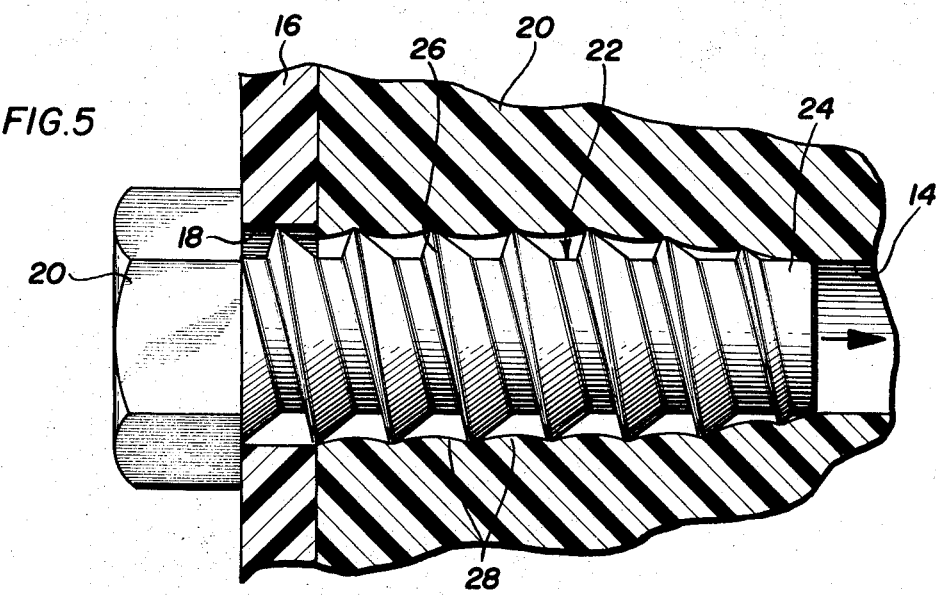
FIG. 5 is an enlarged sectional view showing the threaded fastener as it is inserted into the pliable plastic material and showing the plastic material flowing over and around the threads as the fastener is driven forward.

Referring again to FIG. 1 the threads, at least in the area of the locking portion 26, are provided with an included angle A which may be in the order of about 60°. The front flank angle B preferably is in the order of about 40° to 60° while the rear flanks angle C is in the order of about 0° to 20°. In the preferred embodiment of this invention the angle B is on the order of about 50° to 55°, while the angle C is on the order of about 5° to 10°. By so providing threads with a gradual sloping front flank and a sharp rear flank on the threads the fastener can be driven inward relatively easily, with the use of an inpact tool or the like, through the pliable plastic material 12 without rotating the fastener. Hence, a straight forward axial motion, as shown in FIG. 5 allows the fastener to be inserted completely in position with the head portion 20 abutting the wall portions around the opening or apertures of the member 16. FIG. 5 depicts the flow or stretchable condition of the pliable plastic material as it is urged outwardly away from its normal position to allow passage of the threads of the fastener. This is shown by the undulations 28 formed along the interior surface of the opening 14.

Figure 6:
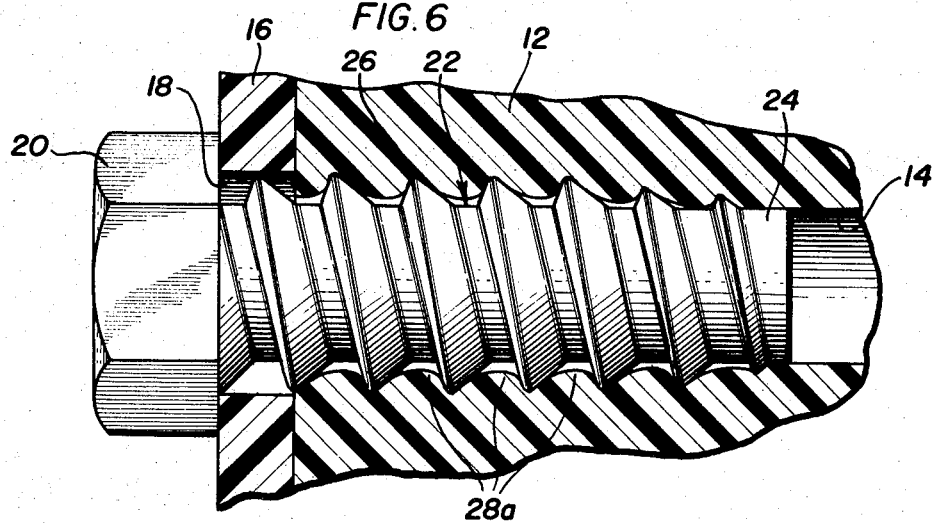
FIG. 6 is a sectional view showing the pliable plastic material flowing into the space between the threads after the fastener is fully driven home.
Figure 7:
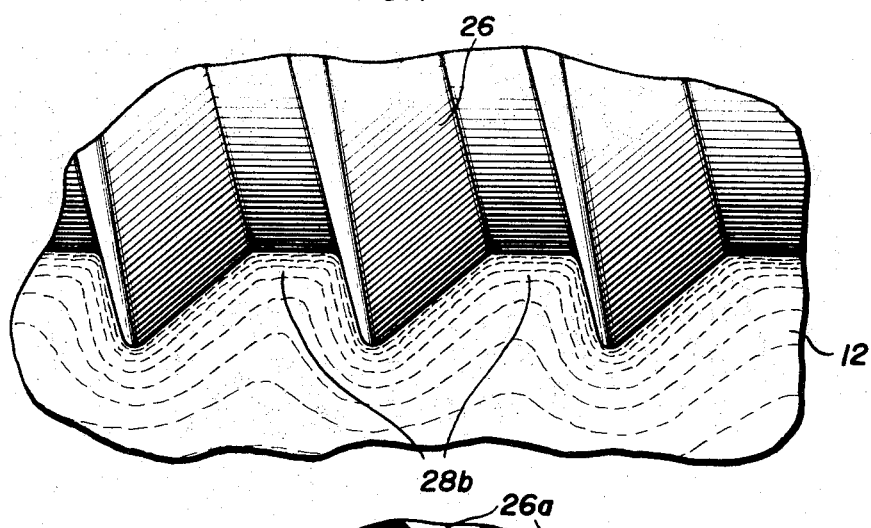
FIG. 7 is an enlarged fragmentary view illustrating the flow of pliable plastic material into the threads after the fastener has rotated one-sixth revolution.

In FIG. 6 the undulations are now indicated by reference numeral 28a as they are shown flowing substantially into the space between the threads, this flowing action taking place as a result of resiliency and cold flow properties of the material, that is, its natural tendency to return to its initial condition. The amount of flow of material into the space between the threads is determined by the length of time the screw is in position. Once the screw is driven home it is turned one-sixth revolution, this being the case for triroundular threads, to effect a plowing action of the threads through the pliable and resilient material. The plowing action causes the material to flow completely between the space of the threads, this being shown more clearly at 28b in FIG. 7, so that a tight gripping of the fastener is achieved by the material 12. This turning also increases the axial tension applied to the fastener and thus, firmly holds the member 16 to the body portion 12.

Figure 8:
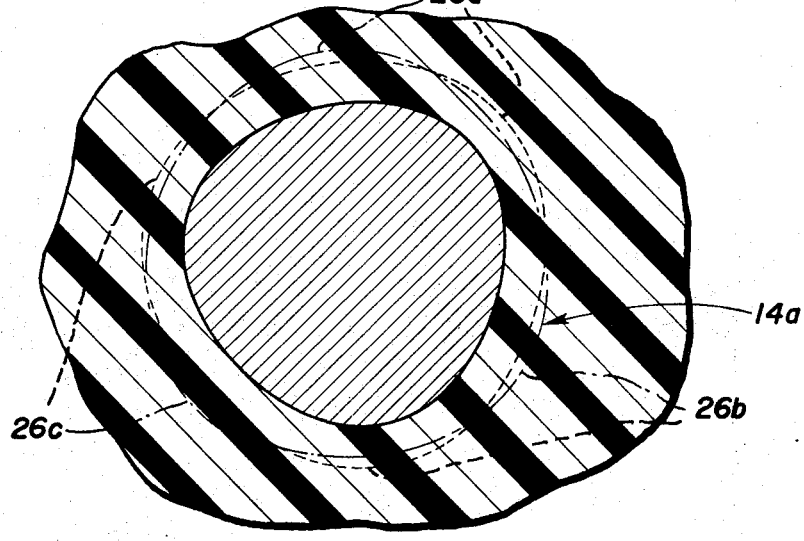
FIG. 8 is an enlarged fragmentary view showing the tri-roundular configuration of the gripping portion of the threads used to effect a plowing action of material for locking the fastener in place.

The locking action obtained is further illustrated in FIG. 8 which shows the tri-roundular configuration of the thread of the fastener in its locked position. The broken line with uniform line segments represents the position of the lobes 26a, 26b, and 26c when the fastener is in locked position. Upon initial insertion, the lobes 26a, 26b, and 26c will in effect rework the aperture 14 to a corresponding tri-roundular shape; viz, including alternate lobes and flat portions. This configuration is illustrated by the broken line formed by non-uniform line segments, and labeled 14a in FIG. 8. The initial position of lobes 26a, 26b, and 26c conforms to the aperture wall 14; however, upon turning these lobes will plow into the flat portions of the wall to the position illustrated by said uniform line segments. It will be noted that the number of lobes formed on the non-circular locking portion 26 of the fastener determines the fraction of revolution that the fastener will be rotated.

While a single specific embodiment of the invention is illustrated herein it will be understood that variations and modifications may be effected without departing from the spirit and scope of the novel concepts disclosed and as set forth by the depending claims.

The invention is claimed as follows:

1. A push-type threaded fastener designed to be driven into an opening formed in pliable resilient material without rotation thereof, and when seated, rotated to provide a locking action which resists inadvertent rotation thereof, said fastener comprising in combination; a head portion to abut the material around the opening receiving the fastener, a threaded shank having a leading guide portion adjacent the work-entering end of said fastener and a trailing locking portion intermediate said guide portion and said head portion, said leading guide portion including a plurality of thread turns of a generally circular configuration with a crest diameter of said thread turns increasing in a direction away from said work-entering end; said trailing portion including a plurality of thread turns of a non-circular, multilobular configuration, said non-circular threads having a maximum crest height at the lobe portions thereof which is greater than the maximum crest height of said circular thread turns on said leading guide portions, both said circular and non-circular threads having a sloped front flank surface facing toward the leading end of said threaded shank to allow the pliable, resilient material easily to slide thereof as the fastener is driven into the opening formed in said material, and a sloped rear-flanked surface facing toward head portion, said front flank defining a flank angle from about 40° to 60°, with said rear flank defining a flank angle from about 20° to 0°, such that the included angle is approximately 60°, with said flank surfaces merging smoothly to define a crest apex over which said resilient material will flow and conform to the shape of said crest apex to be disposed on opposite sides thereof thereby providing means which resists pullout, wherein said fastener may be rotated a fractional part of a revolution to cause said lobular portion on the trailing non-circular thread to bite into the resilient material and afford a locking action which resists inadvertent rotation.

2. The push type threaded fastener according to claim 1, wherein said non-circular, enlarged diameter threads are tri-roundular in the cross section.

* * * * *